United States Patent
Kolbe et al.

(10) Patent No.: US 12,060,303 B2
(45) Date of Patent: Aug. 13, 2024

(54) METERING DEVICE FOR WITHDRAWING AND DISPENSING A MELT AND METHOD FOR PRODUCING THE METERING DEVICE

(71) Applicant: SCHUNK KOHLENSTOFFTECHNIK GMBH, Heuchelheim (DE)

(72) Inventors: Philipp Kolbe, Giessen (DE); Thomas Wamser, Heuchelheim (DE); Anna-Lena Spenler, Heuchelheim (DE); Michael Kämmler, Lich (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 323 days.

(21) Appl. No.: 17/612,331

(22) PCT Filed: Jun. 18, 2020

(86) PCT No.: PCT/EP2020/066928
§ 371 (c)(1),
(2) Date: Nov. 18, 2021

(87) PCT Pub. No.: WO2020/254485
PCT Pub. Date: Dec. 24, 2020

(65) Prior Publication Data
US 2022/0315494 A1    Oct. 6, 2022

(30) Foreign Application Priority Data

Jun. 21, 2019  (DE) .................. 10 2019 116 844.9

(51) Int. Cl.
*C04B 35/80* (2006.01)
*B22D 39/02* (2006.01)
(Continued)

(52) U.S. Cl.
CPC .............. *C04B 35/80* (2013.01); *B22D 39/02* (2013.01); *B22D 41/16* (2013.01);
(Continued)

(58) Field of Classification Search
CPC ..................................................... C04B 35/80
See application file for complete search history.

(56) References Cited

U.S. PATENT DOCUMENTS 5,603,983 A   2/1997  Clough et al.
5,876,659 A   3/1999  Yasutomi et al.
(Continued)

FOREIGN PATENT DOCUMENTS

CN   105254320 A   1/2016
CN   108892522 A   11/2018
(Continued)

OTHER PUBLICATIONS

2018.*
(Continued)

*Primary Examiner* — J C Jacyna
(74) *Attorney, Agent, or Firm* — LADAS & PARRY LLP; Malcolm J. MacDonald, Esq.

(57) ABSTRACT

A metering device (10) for withdrawing and dispensing a melt consisting of or containing an oxide fibre reinforced oxide ceramic composite material.

16 Claims, 2 Drawing Sheets

Figure 4:
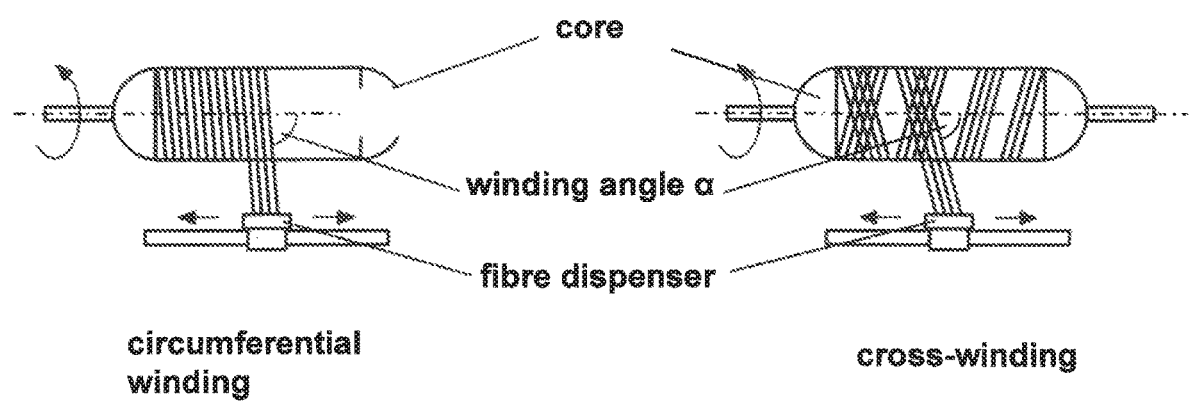

(51) Int. Cl.
*B22D 41/16* (2006.01)
*C04B 35/628* (2006.01)
*C04B 35/64* (2006.01)
*C04B 41/45* (2006.01)
*C04B 41/50* (2006.01)
*C04B 41/86* (2006.01)

(52) U.S. Cl.
CPC .. *C04B 35/62852* (2013.01); *C04B 35/62855* (2013.01); *C04B 35/62892* (2013.01); *C04B 35/64* (2013.01); *C04B 41/4543* (2013.01); *C04B 41/4582* (2013.01); *C04B 41/5022* (2013.01); *C04B 41/86* (2013.01); *C04B 2235/3217* (2013.01); *C04B 2235/3244* (2013.01); *C04B 2235/5224* (2013.01); *C04B 2235/5256* (2013.01); *C04B 2235/616* (2013.01); *C04B 2235/77* (2013.01); *C04B 2235/9676* (2013.01)

(56) References Cited

U.S. PATENT DOCUMENTS

| | | | |
|---|---|---|---|
| 2006/0061018 A1 | 3/2006 | Frank-Guenter et al. | |
| 2006/0283570 A1 | 12/2006 | Vincent | |
| 2007/0256599 A1 | 11/2007 | Rigsby et al. | |
| 2021/0213521 A1* | 7/2021 | Scofield | C04B 41/457 |

FOREIGN PATENT DOCUMENTS

| | | | | |
|---|---|---|---|---|
| CN | 110642604 | * | 1/2020 | ............ C04B 35/80 |
| CN | 11230076 | * | 6/2020 | ........... C04B 35/565 |
| DE | 10 2010 055 221 A1 | | 6/2012 | |
| DE | 10 2013 104 416 A1 | | 10/2014 | |
| DE | 10 2014 106 560 B3 | | 7/2015 | |
| DE | 10 2016 007 652 A1 | | 12/2017 | |
| DE | 10 2017 202 221 A1 | | 8/2018 | |
| DE | 102017206452 | * | 9/2018 | ........... C04B 35/106 |
| EP | 0 126 797 A1 | | 12/1984 | |
| EP | 2 349 948 A1 | | 8/2011 | |
| EP | 2 848 509 A1 | | 3/2015 | |
| EP | 2 942 342 A1 | | 11/2015 | |
| WO | 2016/184776 A1 | | 11/2016 | |

OTHER PUBLICATIONS

Chinese Office Action and Chinese Search Report issued on Aug. 31, 2022, corresponding to Chinese Patent Application No. 202080045444.0.

International Search Report, dated Sep. 9, 2020, corresponding to PCT/EP2020/066928.

* cited by examiner

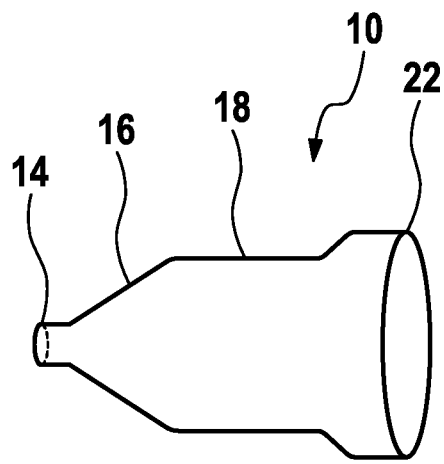
Fig. 1
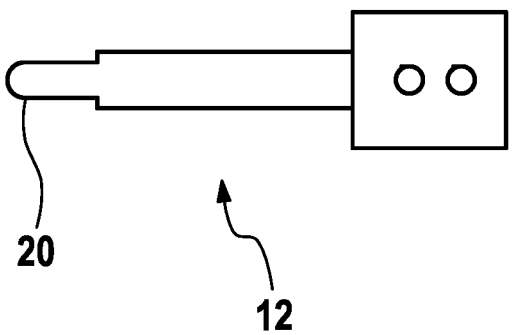
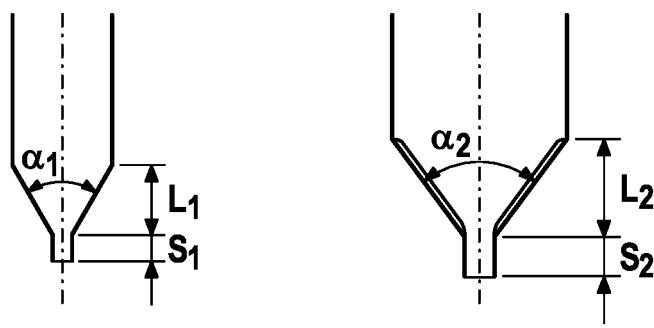
Fig. 2      Fig. 3

METERING DEVICE FOR WITHDRAWING AND DISPENSING A MELT AND METHOD FOR PRODUCING THE METERING DEVICE

The invention relates to a metering device, preferably to a metering crucible or container for vacuum-assisted metering, for withdrawing and dispensing a melt, preferably a metal melt, in particular a non-ferrous metal melt, in particular an aluminum melt or a melt containing aluminum.

The invention relates in particular to the field of processing of metal melts, in particular non-ferrous metal melts, preferably aluminum melts, the melt being drawn in by negative pressure and then poured for example into a mold. A spout of a so-called metering crucible is here usually immersed into a liquid aluminum melt, where if necessary an oxide coating must be broken through.

Corresponding metering crucibles can be produced from a monolithic ceramic such as aluminum titanate. Typical wall thicknesses are between 10 and 25 mm.

After immersion into the melt, the latter is drawn into the metering crucible by negative pressure. The pressures are usually <800 mbar. After the required filling of the crucible, it is closed on the intake opening side by means of a stopper consisting for example of silicon carbide. With an automatable movement device, preferably a robot arm, the crucible is then pulled out of the melt and aligned on a mold.

The melt flows out as the stopper frees the opening and at the same time negative pressure is reduced to a certain extent.

The wall thickness and the high density of aluminum titanate ($3.7\ g/cm^3$) result in the disadvantage that the thermal shock resistance of the material is negatively affected. The heating up of the crucible for high component volumes takes a long time. There is a risk of solidification of the melt due to heat dissipation.

The drawback of the known metering crucibles is also that only moderate mechanical characteristic values are attained with bending strengths of considerably less than 80 MPa, and a brittle fracture behavior and the already mentioned low thermal shock resistance can be observed. Due to the immersion of the crucible, a large thermal gradient results along the axis and along the wall thickness. The required thermal shock resistance is not met due to the unfavorably low thermal conductivity of aluminum titanate (second thermal shock parameter).

It can also be observed that the crucible material reacts with aggressive aluminum melts which are processed for example during finishing or grain refining or other alloy compositions, in particular alkaline melts containing sodium or strontium additives. The resultant reactions lead to a successive destruction of the metering device, and in the case of severe corrosive/chemical attack also to a contamination of the melt.

It has also been shown that the aluminum titanate has an unfavorable wetting behavior, so that buildups of solidified aluminum until the stopper seizes up in the metering crucible can be observed. In this case, dismantling must be performed in the cold state, with the result that abrasions caused thereby can lead to wear and destruction of the metering crucible and stopper.

The monolithic ceramic of aluminum titanate is porous and covered with fissures in order to improve the thermal shock behavior. The crucibles are produced by slip casting of particle-laden slurries. The slip casting method has disadvantages with respect to component geometry or wall thicknesses. In the slip casting method, the wall thickness inside the component cannot in general be varied. The maximum wall thickness is limited. The wall thickness is proportional to the root of the casting duration. During the casting process, the formation of gradients can occur due to differing particles. Disadvantages are also evident during sintering of high-volume components. Also, the shrinkage occurring leads to considerable problems in high-volume components.

The object underlying the present invention is to improve a metering device of the type mentioned at the outset such that a reproducible, rapid and precise metering of metal melts, in particular aluminum melts, is possible without the formation of melt artefacts, contamination of the melt or air pockets, where the metering device should be usable for a vacuum-assisted casting process and the metering device should be movable.

To solve the problem, the invention substantially provides that the metering device consists of or contains an oxide-fiber-reinforced oxide ceramic composite material with an open porosity in particular of 20% to 40%.

If appropriate, the metering device consisting of the oxide-fiber-reinforced oxide ceramic composite material can be coated on the surface side or compacted. Surface side means inside or outside or both inside and outside.

To do so, it is in particular provided that the oxide-fiber-reinforced oxide ceramic composite material is coated at least in some areas, in particular on the outside, to form a preferably closed-pore coating. It is possible here for glass solder or organometallic compounds to be used as coating material.

In particular, the invention provides that a ceramic coating, a precursor-based coating or a glass-like coating is applied to the basic body.

There is the possibility for the coating to be applied by thermal spraying.

The composite material contains oxide ceramic fibers, formed from preferably at least one material from the group $Al_2O_3$, $SiO_2$, $ZrO_2$, $Y_2O_3$, $TiO_2$, CaO, MgO, $Y_2O_3$-stabilized $ZrO_2$.

It is furthermore provided that the composite material contains an oxide ceramic matrix, formed from preferably at least one material from the group $Al_2O_3$, $SiO_2$, $ZrO_2$, $Y_2O_3$, $TiO_2$, CaO, MgO, $Y_2O_3$-stabilized $ZrO_2$.

It is in particular provided here that the matrix and the fibers consist of or contain the same oxide ceramic material(s), or the main constituents of the matrix and the fibers match, e.g. consist of $Al_2O_3$.

It must be particularly emphasized that the metal in the composite material and that of the melt or main constituent of the melt should be identical.

Due to the use of the oxide ceramic composite material, a non-brittle material is provided which exhibits thermal shock resistance, sufficient mechanical strength and, regardless of the porosity and surprisingly, the required vacuum tightness. There are no solidification processes or the formation of inhomogeneities. This increases process reliability when processing the melt.

Furthermore, advantageous wetting and corrosion properties have been revealed in particular during the metering of aluminum melt when the metal of the oxide ceramic composite material is aluminum, i.e. the fibers and the matrix too consist of or substantially contain $Al_2O_3$. A good resistance to alkaline aluminum melts is also evident, so that an expansion in the range of applications can be achieved.

Due to the identical metals, contaminations of the melt by the material of the metering device or crucible or container are ruled out.

Use of the oxide ceramic composite material enables a low component weight to be achieved in comparison with the prior art, so that the process can be accelerated during metering. Wear on the automatable movement device or robotic unit is also lower in comparison with the prior art, since lower masses have to be moved.

The metering device itself can be produced by winding fibers onto a die replicating the internal geometry of the metering device or by the use of textile fabrics, meshes and mats from the oxide ceramic fibers. The result of this is advantages in particular regarding the geometrical design of the metering device, allowing design improvements to be achieved.

The internal geometry is identical to the interior of the metering device into which the melt is drawn by suction.

Ventilation possibilities and the attachment or integration of heating elements are possible due to the low wall thickness. The low wall thickness furthermore offers the advantage that only a small amount of heat is withdrawn from the melt, so that work is possible at a melting temperature which is lower in comparison to the prior art. This results in energy advantages. Structures necessary for handling of the metering device can be formed without any problem. Thanks to the low weight, simple assembly is possible. Regardless of that, simple production is possible.

DE 10 2013 104 416 A1 relates to monolithic ceramics with fabric mesh reinforcement that are used for construction and for armor plates. The ceramic can also be used for graphite reinforcement.

The subject matter of WO 2016/184776 A1 is a composite tube consisting of two coatings, one of which consists of a non-porous monolithic oxide ceramic and one of an oxide fiber composite ceramic.

A method for producing a component of fiber-reinforced composite material is shown in DE 10 2010 055 221 A1.

Oxide ceramic composite materials having oxide ceramic fiber reinforcements are known. To that extent, reference must be made for example to EP 2 848 509 A1 or to DE 10 2016 007 652 A1.

Turbine vanes and turbine blades of steam turbines are described as an example of application for a corresponding material in DE 10 2017 202 221 A1.

A use for areas in which vacuum-assisted operation is required—as in casting processes—does not however exist, in particular against the background that it should be assumed due to the porosity that corresponding materials are unsuitable for vacuum processes. Surprisingly, it has however become clear that a reproducible, fast and precise metering of non-ferrous metal melts is also possible when oxide ceramic fiber-reinforced composite material in accordance with the invention is used.

Thin-walled metering containers or crucibles, where necessary with supplementary components or attached elements, can be produced from the porous oxide-fiber-reinforced oxide ceramic, the volumes being designed such that up to 50 kg of melt can be received and transported without any problems.

The individual fiber filaments, which are in particular combined as fiber bundles or rovings with several hundred individual filaments, should have a diameter between 5 µm and 20 µm, in particular between 10 µm and 12 µm. The density should preferably be between 2.0 g/cm$^3$ and 6.0 g/cm$^3$, more preferably between 3.0 g/cm$^3$ and 4.0 g/cm$^3$.

If the open porosity, i.e. the cavities in the metering device or its oxide ceramic composite material which are linked to one another and to the environment, can be in the range between 20% and 40%, then the range between 27% and 32% must be specified for preference. Due to the open porosity, a low conductivity of the melting device of in particular less than 10 W/mK is achieved.

The wall thickness of the metering device, i.e. of the crucible or container, should be preferably between 1 mm and 20 mm, more preferably between 1 mm and 4 mm.

The geometric design is variable and can in particular be rotation-symmetrical.

The invention also includes the metering device being designed as an insert for a metallic structure. This renders the metallic structure of the melt, which could otherwise be destroyed, non-attackable.

In particular, it is provided that further components connected to the metering device are produced from the same oxide ceramic material as the metering device.

As already mentioned, the metering device can be produced by a winding technique or on the basis of semi-finished textile fiber products, such as fabrics, meshes and mats.

As already mentioned, the invention does not rule out that a coating is additionally provided.

Single-layer or multi-layer coatings or coating systems, preferably with thicknesses in the range between 50 µm and 2 mm, can be used as coatings to reduce gas permeability. The structure of the basic body, i.e. the oxide ceramic composite material, should be largely retained here.

The composite material is generally speaking infiltrated or modified by the coating only superficially up to a depth of 500 µm, to permit a good coating adhesion.

To reduce the gas permeability, the porosity of the coating(s) should be considerably less than that of the basic material.

In particular, it is provided that the coating(s) is/are closed-pore, preferably achieving a density of at least 97% of the theoretical density of the coating material. Theoretical density is understood to be the density at which a body produced from the material has no pores.

The gas tightness should be improved by the coating, such that the metering device can be coated on the inside, i.e. on the melt side, or on the outside. A coating both inside and outside is of course also not ruled out.

The coating material can preferably be identical to that of the basic body, i.e. of the oxide ceramic material.

The coating material can consist of crystalline and of oxide ceramic constituents.

Regardless of this, the coating material should be temperature-resistant up to 1200° C. and resistant to corrosion and to abrasion.

The metering device can be coated on one side or on both sides, i.e. inside and outside. A coating can also be limited to defined areas.

Possible coating variants are for example the application of glass solders, precursor-based coatings or thermal spraying.

With so-called glass solders, a glass-like coating crystallizes on the substrate by a temperature treatment in the course of production of the coating. The coating particles are applied by a slurry, e.g. using brushes. To that extent, reference is made to the disclosure of DE 10 2014 106 560 B3 or EP 2 942 342 A1. With a corresponding application method by means of glass solder, a dense ceramic coating is formed.

In the case of the precursor-based coatings, liquid organometallic compounds can be used. Application is wet-chemical, for example by spraying or immersion. These compounds pyrolyze, ceramicize and crystallize fully due to temperature treatment. The volume shrinkage in the course of processing can be reduced by adding passive and active fillers.

Passive fillers can be for example aluminum oxide or zirconium oxide. Active components in the coating would be Al, $ZrSi_2$, $TiB_2$. The latter oxidize in the course of the synthesis and a volume increase results.

With thermal spraying, the coating particles are melted on with the aid of a torch, for example plasma jet or arc, and applied to the substrate by a gas stream. The melted-on particles impact the substrate, flatten and solidify. On impact there is a mechanical interlocking of the substrate and particles. A further temperature treatment is not necessary.

The coating material used for thermal spraying should, for reasons of thermomechanical and thermodynamic compatibility, be one matching the substrate material, i.e. the composite material, in respect of the main constituents. If a composite material of $Al_2O_3$ and $ZrO_2$ is used, then the particles should also consist of $Al_2O_3$ and $ZrO_2$. Thermal spraying works with appropriate particles consisting of these materials. However, it is also possible to work reactively with aluminum, which oxidizes when the substrate material has $Al_2O_3$ and $ZrO_2$ as its main constituents. From the expansion for $Al_2O_3$, YAG (yttrium aluminum garnet) and $Y_2Si_2O_7/YSiO_5$ are suitable.

A coating system can be applied that forms one coating overall. Coating systems are several individually differentiable layers of a coating. For example a coating system can consist of a bond coat for bonding, a TBC (thermal barrier coating) for thermal insulation and on the outside, i.e. on top, an EBC (environmental barrier coating) as a corrosion preventer. Each individual layer has a specific function. An expansion mismatch can also be reduced by coatings with graduated buildup.

Depending on the coating method, the penetration depth can be varied. The term penetration depth is intended to express that there can be a transitional area between coating and substrate. If organometallic precursors are used, they penetrate deeper into the substrate material and infiltrate it, resulting in some cases in a reaction between coating material and substrate.

In thermal spraying, the melted or partly melted particles impact the colder substrate surface, resulting in a mechanical adhesion. In this case, the penetration depth is very low, or only a superficial adhesion can result, so that in practice it cannot be regarded as a penetration depth.

Regardless of how the coating is produced, the properties of the substrate material are retained. The coating results in the advantage that embrittlement does not occur. An increase in the gas tightness is achieved due to the coating. The coating has a high degree of hardness and offers both abrasion and corrosion resistance.

In particular, the teachings in accordance with the invention are characterized in that fiber reinforcements designed to cope with the load can be provided. Thicker material can thus be provided, in particular in the dispensing and hence the withdrawing area of the metering device, to protect areas of increased load.

The geometrical restrictions occurring according to the prior art when using monolithic ceramics do not apply.

In particular, it is provided that a corresponding metering device is defined to process non-ferrous metal melts that consist of or contain Al, Si, Mg, Cu, Zn, Sn, Ti, Na, Sr, B, where aluminum melts or aluminum alloy melts should be mentioned in particular.

The fiber reinforcement including the porous matrix leads to a considerable increase in strength and damage tolerance compared with the monolithic ceramic to be found in the prior art. This leads to a quasi-ductile material behavior, so that brittle fracture is prevented and impacts or similar mechanical stresses must be classed as non-critical. For example, collisions during movement of the metering device that might be caused by faulty teaching of a robot are less problematic.

Surprisingly, the porosity of the composite material during the intake, holding and metering process of the melt, achieved by means of negative pressure, does not represent a technically relevant problem. High metering precision and exact quantity detection are possible.

This does not however rule out that an additional coating can be provided.

In particular when the fibers and the matrix consist of the same oxide, such as $Al_2O_3$, this leads to prevention of corrosion in the material of the metering device and to a very favorable wetting ratio, for example in melts of aluminum and its alloys. Additives of, for example, zirconium oxide can be advantageous here.

The invention is therefore also characterized in that the proportion by weight of the additive or matrix component zirconium oxide, where necessary reinforced with yttrium oxide, is 5% to 30%, in particular 12% to 25%, of the oxide ceramic of the matrix.

The favorable wetting behavior prevents for example the closure, such as a stopper, which can consist for example of SiC or of an oxide ceramic material like that of the metering device, seizing up in the metering device.

The wear is reduced. The cleaning effort due to hard-to-remove buildups is reduced and damage is avoided.

As already mentioned, mass and structural changes basically do not occur when aggressive, for example alkaline aluminum melt alloys are handled, in particular when the matrix and the reinforcing fibers consist of or contain aluminum oxide.

The wear is reduced and the service life is considerably prolonged.

Thanks to the lightweight construction resulting from the material, equipment and robotic systems are subjected to lower mechanical loading, permitting downsizing.

The movement duration of the metering device can be reduced in comparison to the prior art, and hence also the process duration overall.

A further advantage of the lightweight construction is the thermal and temperature insulation properties, such that by means of minor temperature falls, i.e. temperature drops in the melt, new possibilities for processing are created. Energy savings are achievable.

The production technology ensures freedom in the geometrical design. Any complex geometries with undercuts can be achieved. The metering behavior can be improved by geometry changes or adjustments.

Due to the use in accordance with the invention of the oxide ceramic materials, larger-volume crucibles can be produced in comparison to the prior art. The low wall thickness enables the melt to be additionally temperature-controlled by heating and cooling elements surrounding the metering device.

There is also the possibility that the stopper is designed hollow, allowing sensors such as temperature sensors to be integrated therein.

The opening, i.e. the spout, of the metering device can be designed such that melted droplets cannot stick.

It is furthermore possible to integrate strainer elements or filters to clean the melt.

The flow of the melt can be designed disturbance-free when flow aids are provided inside the metering device whose negative form is replicated on the die, onto which the fiber bundles are wound, or the flat fiber fabrics, mats and meshes are laid that were previously impregnated with a slurry containing oxide ceramic particles that form the matrix.

The invention is therefore also characterized by a method for producing a metering device, in particular a vacuum-assisted metering crucible or container, for withdrawing and dispensing a melt, preferably a metal melt, preferably a non-ferrous metal melt, in particular an aluminum melt or a melt containing aluminum, comprising the method steps Impregnation of an arrangement of oxide ceramic fibers with a slurry containing oxide ceramic particles, Winding or laying of the impregnated arrangement of fibers onto a die replicating the internal geometry of the metering device, Drying of the arrangement laid or wound on the die.

The arrangement is then removed from the die, in particular fully or partially removed from the mold. This is followed by sintering. Where necessary the metering device so produced is reworked.

One or more endless fiber bundles or flat structures, in particular fiber mats, fabrics or meshes, are used as the arrangement here.

In particular, it is provided that the drying process for forming a green compact from the arrangement is performed in a temperature range between 40° C. and 250° C., in particular between 80° C. and 150° C.

Drying and full or partial removal from the mold is followed by sintering, in particular at a temperature between 1000° C. and 1300° C., preferably between 1150° C. and 1250° C.

Further details, advantages and features of the invention can be gathered not only from the claims and in the features to be found therein, singly and/or in combination, but also from the following description of preferred examples to be found in the drawing and from their explanations.

The drawing shows in:

FIG. 1 an illustration of the principle of a metering device for withdrawing and dispensing a melt with separately drawn stopper, FIG. 2 a section from FIG. 1, FIG. 3 a variant of the illustration in FIG. 2 and FIG. 4 an illustration of the principle of a winding process.

The figures show purely by way of example a metering device for withdrawing and dispensing a melt, in particular a metal melt, which is also referred to as a metering crucible or container 10 and in the following is called metering crucible for simplicity.

The metering crucible 10 has on the withdrawing/dispensing side a mouth opening 14 closable using a stopper 12 and merging into a conical and then hollow-cylindrical section 16, 18.

The external diameter of the stopper 12, more precisely in its distal section 20, matches the internal diameter of the spout or mouth opening 14. The mouth opening can accordingly be closed or freed by axial movement of the stopper 12.

The metering crucible 10 consists of a fiber-reinforced oxide ceramic composite material of the previously described material(s).

The porosity of the metering crucible 10 should be in the range of in particular between 27% and 32%.

The stopper 12 can consist of an identical material to that of the metering crucible 10 or also for example of silicon carbide.

If the stopper 12 is produced from an oxide ceramic composite material, it can thus be designed hollow and for example contain one or more sensors to check the process and where necessary control or regulate it.

The metering crucible 10 is preferably produced by winding, although prepregs that can be laid onto a die replicating the internal geometry of the metering crucible 10, or a combination of these methods, can also be used.

Fiber bundles, so-called rovings, are wound onto the winding core, where the individual fiber filaments should have diameters between 5 µm and 20 µm, in particular in the range between 10 µm and 12 µm. The density should be in the range between 2 g/cm$^3$ and 6 g/cm$^3$, preferably between 2.5 g/cm$^3$ and 3.2 g/cm$^3$.

Before winding onto the winding core, the fiber bundles are passed through a slurry and thereby impregnated. The slurry contains the ceramic particles forming the matrix of the composite body.

The proportion of ceramic particles can be 10% by volume to 50% by volume, in particular 20% by volume to 40% by volume, relative to the total volume of the slurry.

In particular, a water-based slurry is used with preferably organic additives, for example polyols, polyvinyl alcohols or polyvinyl pyrrolidones, dispersion binders, preferably styrene acrylate dispersions.

The slurry can contain at least 10% by wt. to 20% by wt., preferably at least 24% by wt., e.g. 21-35% by wt., of glycerin relative to the total weight of the ceramic particles.

Both for the ceramic particles and for the fibers, a material in particular from the group $Al_2O_3$, $SiO_2$, $ZrO_2$, $Y_2O_3$, $TiO_2$, CaO, MgO, $Y_2O_3$-stabilized $ZrO_2$ is conceivable as the oxide ceramic.

If an aluminum melt or an aluminum alloy melt is to be metered using the metering crucible 10, $Al_2O_3$ should be used as the material both for the matrix, i.e. accordingly the ceramic particles, and for the fibers.

The slurry can contain if necessary additives such as $ZrO_2$, where the proportion can be between 5% and 30%, in particular between 12% and 25% as a % by weight of the entire powder quantity of the ceramic metal oxide.

The proportion by volume of the ceramic particles should be 20 to 50% by volume relative to the total volume of the slurry.

The corresponding impregnated fiber bundles are now wound onto the winding core, then dried, in particular in the temperature range between 40° C. and 250° C., preferably in the range between 80° C. and 150° C. A body thus produced is divided and removed from the winding core. This is followed by sintering in the temperature range between 1000° C. and 1300° C., in particular between 1150° C. and 1250° C. If necessary reworking takes place and then use of the metering crucible 10 thus produced.

The drying duration is temperature-dependent and is between 2 h and 48 h, preferably between 12 h and 24 h.

Sintering is done over a temperature/time curve with various holding stages and durations, where the holding duration at the maximum temperature should be between 5 min and 24 h, preferably between 1 h and 12 h.

Due to the winding technique used, the geometry of the metering crucible 10 can be varied to the required extent depending on the geometry of the winding core. This is illustrated in principle in FIGS. 2 and 3. There is thus the possibility of varying the opening angle of the conical section 16 to the required extent. In FIG. 2 the angle α1 is smaller than the angle α2 in FIG. 3. Furthermore, the length of the spout 14 can be varied, as is made clear by a comparison of FIGS. 2 and 3 in respect of the sections S1, S2. The length of the conical section 16 can also be varied (L1<L2).

There is furthermore the possibility of varying the wall thickness of the component or of designing the end sections of the winding core such that flow aids are created inside the cones, as indicated purely in principle by FIG. 3.

For example ribs can be formed, preferably in helical form. Wave structures can also be provided running concentrically about the longitudinal axis of the metering crucible, to affect to the required extent the flow behavior of the melt.

In particular it is provided that the fiber volume content of the metering device is 35% to 50%, preferably 32% to 42%.

The following must be set forth regarding the winding technique.

Winding processes are used to produce rotation-symmetrical parts. The internal geometry of the object is predetermined by the so-called winding core on which the fibers impregnated with the matrix are laid.

For the winding core, a distinction is made between reusable, lost, meltable and strippable cores. In the present case, the metering crucibles are removed from the core, such that the latter can be used again. For smaller components, meltable cores are frequently used, and strippable cores for components of larger diameter.

Winding is usually performed with a winding machine matching a CNC lathe. The winding core is here clamped at one of its ends in a three-jaw chuck and at the other end mounted for example on a tailstock.

To wind rovings, i.e. fiber bundles, which can for example comprise 100 or more individual fibers, so-called filaments, onto the winding core, they are unwound from a spool receptacle. Then the rovings can pass deflecting pulleys, by means of which the tension of the rovings is set. The fiber bundle is now passed through a thread eye over further deflecting pulleys and through a slurry bath of which the composition has been described above. After impregnation of the fibers, they are passed over one or more further deflecting pulleys, which likewise determine the thread tension and, by the number of revolutions, the winding speed and the length of the consumed fiber strand, centered by a thread eye, and laid on the winding core as it rotates. The thread tension also has a greater significance here. If it is too low, the fibers are not pressed onto the winding core to a sufficient extent. If the tension is too high, the slurry cannot penetrate sufficiently between the individual fiber filaments, and tearing of the roving might ensue.

After the winding process, the wound fiber architecture is bonded using peel ply. This is intended to provide an even surface, compact it by displacing excess slurry and hence increase the fiber volume content, while additionally protecting the component.

In circumferential winding, also called radial winding, the rovings are laid parallel, as can be seen in the illustration in FIG. 4. With cross-winding, the rovings are laid from one end to the other end, in order to provide a fiber reinforcement in the x and y directions too. The winding angle is measured from the laid fiber strand, against the rotation axis, and influences the absorption of axial loads.

If a wound part has purely unidirectional circumferential windings, i.e. if the angle α is around 90°, very high tensile strengths are achievable in the tangential orientation. If the winding angle is <45°, higher axial loads are absorbed. With reinforcement in the axial direction, i.e. with small winding angles, the problem arises during production that fixing of the roving at the end of the body is no longer possible.

Various computation programs are available for coordination of the winding type, winding angle and number of layers (fiber requirement).

After the winding process, the wound fiber architecture is bonded using a peel ply to obtain an even surface. Compaction is also achieved by displacing excess slurry, increasing the fiber volume content while the component is additionally protected. This is followed by drying and the sintering process.

The following represents an example:

Firstly, oxide ceramic prepregs are produced. To do so, fabric made from aluminum oxide fibers (>99% $Al_2O_3$) is impregnated with a water-based slurry containing oxide ceramic particles. The filament diameter is 10-12 µm and the yarn fineness is 20,000 denier. The slurry has a solids content of 30% by volume, consisting of 80% by wt. $Al_2O_3$ particles and 20% by wt. $ZrO_2$ particles. The mean particle size is 1 µm. As a dispersant, 2% by weight of polyacrylic acid is added. After a reduction in the water content of the infiltrated fiber architecture, the resultant prepreg can be processed by cutting it to size and laying it onto a die replicating the internal contour of the metering crucible. After that, the die loaded with the prepreg is clamped into a winding device. Then the aluminum oxide fiber rovings (>99% $Al_2O_3$) of 20,000 denier yarn fineness are passed from a spool receptacle over deflecting pulleys and through an immersion bath, and laid on the rotating winding core. The rovings are centered by a thread eye. The thread tension is in the range from 10 to 90 N and is set using the deflecting pulleys. The slurry inside the immersion bath has a solids content of 32% by volume of ceramic particles relative to the total volume of the slurry, consisting of 80% $Al_2O_3$ particles and 20% $ZrO_2$ particles. The mean particle size is 1 µm. As a dispersant, 2% by weight of polyacrylic acid is added. The wound fiber architecture of the shaped composite material is consolidated by reducing the water content, so that a green compact is obtained. After drying, the wound fiber architecture can be removed from the core. This is followed by sintering at 1200° C. Reworking can be performed by turning, milling or grinding.

The invention claimed is:

1. A metering device for withdrawing and dispensing a melt, comprising:
    an oxide-fiber-reinforced oxide ceramic composite material comprising an oxide ceramic matrix, and having an open porosity of from 20% to 40%;
    wherein an inside surface and/or an outside surface of the metering device is coated with at least one coating, or is compacted; and
    a stopper configured to close an opening of the metering device, and comprising a material from the group SiC, or the material of the oxide ceramic matrix.

2. The device according to claim 1, wherein one or more coatings of a thickness d of 50 µm≤d≤2 mm are disposed on the oxide-fiber-reinforced oxide ceramic composite material.

3. The device according to claim 1, wherein the oxide-fiber-reinforced oxide ceramic composite material comprises oxide ceramic fibers, formed from a member selected from the group consisting of $Al_2O_3$, $SiO_2$, $ZrO_2$, $Y_2O_3$, $TiO_2$, Cao, MgO, $Y_2O_3$-stabilized $ZrO_2$, and mixtures thereof, and/or the oxide-fiber-reinforced oxide ceramic composite material comprises an oxide ceramic matrix, formed from a member selected from the group consisting of $Al_2O_3$, $SiO_2$, $ZrO_2$, $Y_2O_3$, $TiO_2$, CaO, MgO, $Y_2O_3$-stabilized $ZrO_2$, and mixtures thereof.

4. The device according to claim 3, wherein the oxide ceramic matrix and the fibers consist of or comprise the same oxide ceramic material, or the main constituents of the oxide ceramic materials match.

5. The device according to claim 1, wherein the metal in the oxide-fiber-reinforced oxide ceramic composite material and the metal of the melt, or of a main constituent of the melt, is identical.

6. The device according to claim 1, wherein the open porosity of the device, or of the oxide-fiber-reinforced oxide ceramic composite material, is between 27% and 32%.

7. The device according to claim 3, wherein the density $\rho$ of the fibers is 2 g/cm³ < $\rho$ < 6 g/cm³, and/or the fiber diameter is from 5 μm to 20 μm.

8. The device according to claim 1, further comprising a metallic structure inserted into the metering device;
wherein the metallic structure has a rigid body and consists of the oxide-fiber-reinforced oxide ceramic composite material of the metering device.

9. The device according to claim 3, produced by winding the oxide ceramic fibers onto a die that replicates an internal geometry of the metering device, and/or by the use of textile mats, meshes, and fabrics from the oxide ceramic fibers.

10. The device according to claim 3, wherein the oxide ceramic fibers consist of endless fibers, or short fibers, or a combination thereof.

11. The device according to claim 1, wherein the device has a wall thickness $W_D$ of 1 mm ≤ $W_D$ ≤ 20 mm, and/or the metering device comprises load-appropriate fiber reinforcements.

12. The device according to claim 1, further comprising flow aids provided on the inside surface of the metering device.

13. The device according to claim 1, wherein the stopper is hollow; and
wherein a sensor is arranged inside the stopper.

14. The metering device according to claim 1, wherein the coating has a density of at least 95% of the theoretical density of the material of which the coating consists.

15. The metering device according to claim 3, wherein the density $\rho$ of the fibers is 3.0 g/cm³ < $\rho$ < 4.0 g/cm³, and/or the fiber diameter is 10 μm to 12 μm.

16. The metering device according to claim 1, having a wall thickness $W_D$ of 1 mm ≤ $W_D$ ≤ 3 mm, and/or the metering device has load-appropriate fiber reinforcements.

* * * * *